United States Patent [19]
Tertinek et al.

[11] 3,932,006
[45] Jan. 13, 1976

[54] PADDLE SHAFT SEAL ASSEMBLY

[76] Inventors: Christian T. Tertinek, 3301 Cheshire Road, Canandaigua; Alan J. Stone, P.O. Box 354, Honeoye, both of N.Y. 14471

[22] Filed: May 22, 1974

[21] Appl. No.: 472,466

[52] U.S. Cl. ............... 308/187; 277/58; 308/187.1
[51] Int. Cl.² ........................................ F16C 33/78
[58] Field of Search ...... 308/187, 187.1, 36.1, 36.5; 277/53, 58, 208, DIG. 6; 29/148.45; 310/90; 259/178 R, 178 A

[56] References Cited
UNITED STATES PATENTS

| | | | |
|---|---|---|---|
| 2,990,220 | 6/1961 | Malone | 308/187.1 |
| 3,112,417 | 11/1963 | Tamm | 310/90 |
| 3,149,888 | 9/1964 | Lennon | 308/36.1 |
| 3,311,429 | 3/1967 | Kocian | 308/187 |

FOREIGN PATENTS OR APPLICATIONS

| | | | |
|---|---|---|---|
| 890,344 | 2/1962 | United Kingdom | 308/187 |

OTHER PUBLICATIONS

Phelps Packing & Rubber Company Pamphlet, "Rubber And Synthetics Section".

*Primary Examiner*—Robert J. Spar
*Assistant Examiner*—Randolph A. Reese

[57] ABSTRACT

A triple seal and spacer means within a multi-part seal housing, including a sealed bearing unit which supports and protects the end of a driven shaft extending outside one peripheral end wall of a container through which the driven shaft passes. Suitable lubrication fittings are provided, and lubricant is forced through these fittings into the interior of the multipart seal housing, past two relatively soft seals having a spacer therebetween, and past another spacer and a relatively rigid long-lasting seal adjacent the wall through which the driven shaft passes.

5 Claims, 3 Drawing Figures

PADDLE SHAFT SEAL ASSEMBLY

BACKGROUND OF THE INVENTION

Seals of diverse materials and shapes are evidenced by the prior U.S. Pat. No. 1,888,957 to Longenecker issued Nov. 22, 1932, flexible rubber diaphragm in a mortar mixer; Phillips (U.S. Pat. No. 2,452,144, issued Oct. 26, 1948), synthetic rubber in an electrical swing joint; Malone (U.S. Pat. No. 2,990,220, issued June 27, 1961), paired seals with metallic spacer rings and bearing retainers; Cotchett (U.S. Pat. No. 2,991,514, issued July 11, 1961), having felt and nylon washers distorted into cup shape; Tamm (U.S. Pat. No. 3,112,417, issued Nov. 26, 1963), having acrylonitrile rubber, in an electric motor, "stable in the presence of lubricant"; Bilocq (U.S. Pat. No. 3,420,590, issued Jan. 7, 1969), alternating metallic and "Teflon" seals for an idler roller; and Vincent (U.S. Pat. No. 3,450,392, issued June 17, 1969), having split, angular, compressible, packing rings.

SUMMARY OF THE INVENTION

Among the objects and advantages of our invention are the following:

1. To provide an inexpensive triple seal to give optimum sealing at the lowest possible cost;
2. To provide a seal wherein any dirt or foreign material can be flushed out with the grease;
3. To provide a pair of relatively "soft" seals, allowing lubricant to be retained therebetween, and flow toward, a rigid (and more expensive) main seal. This type of a triple seal combination also allows slippage of the paired "soft" seals, producing less drag on the shaft, but still accomplishing the sealing function;
4. To provide a plurality of spacers separating the triple seals interiorly of the multi-part seal housing.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
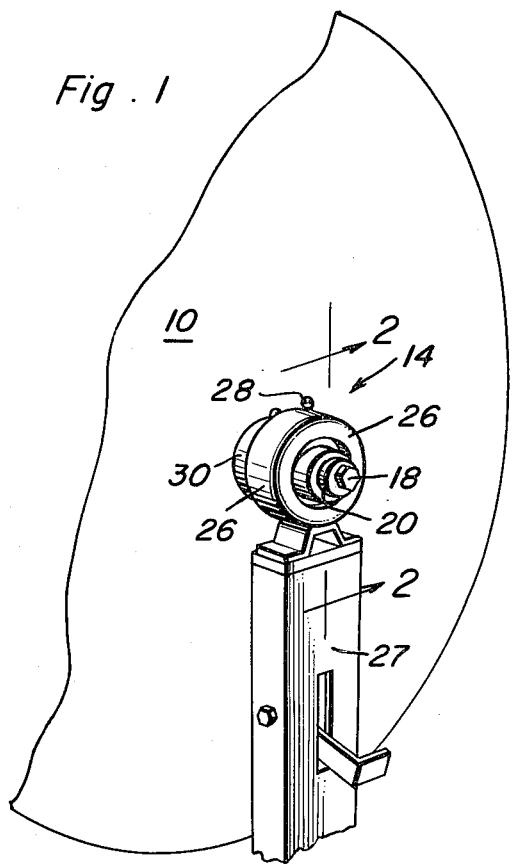
FIG. 1 is a perspective view of one end of a housing seal assembly through which a driven shaft passes.
Figure 2:
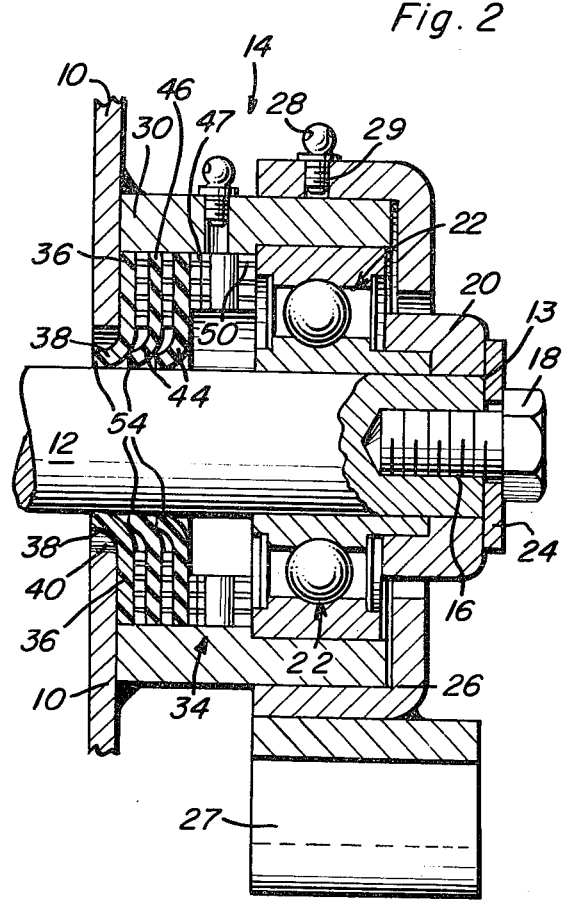
FIG. 2 is a sectional view on an enlarged scale, taken approximately on the line 2—2 of FIG. 1.
Figure 3:
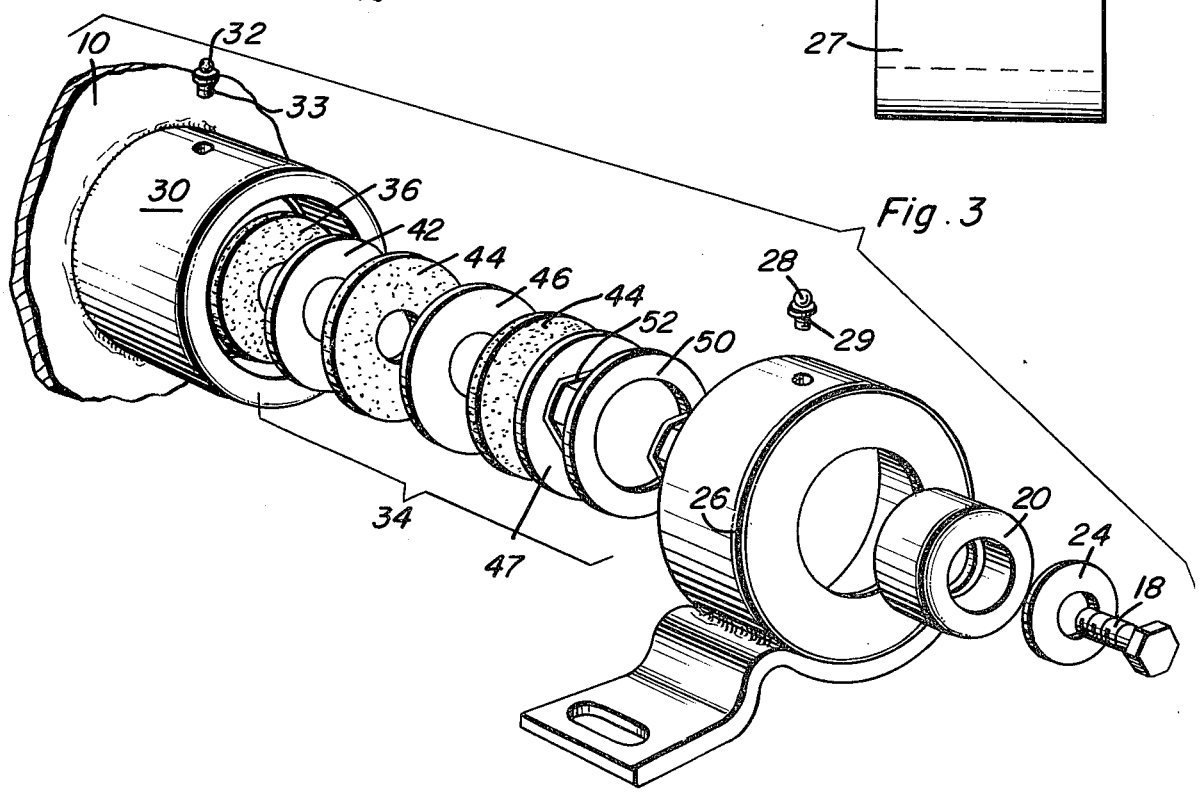
FIG. 3 is an exploded perspective view further showing the interior parts of the sealing arrangement, with the ball bearing unit omitted, prior to assembly.

In the drawings, an end wall 10 of a container structure (drum-shaped, for example, as in a mixer or motor) receives a driven rotary shaft 12 extending both interiorly and exteriorly of the container structure, with a shaft end denoted by reference numeral 13. The outer (exterior) end of the shaft 12 is enclosed by a multi-part seal housing 14. The shaft 12 is centrally bored and threaded at 16 to receive the headed bolt, or similar fastening means 18.

A bearing lock collar 20 surrounds shaft end 13, seats against a sealed ball bearing unit 22, and both are retained in place by a washer 24 under the action of bolt 18. Trunnion housing 26 having grease or lubricating fitting 28, threaded as at 29, surrounds the collar 20 and maintains the sealed bearing unit 22 in place within the housing 14. The trunnion housing 26 is rigidly supported from a support pedestal 27 in a suitable and well known manner to support the seal and bearing unit.

A seal and sealed bearing unit housing 30 is welded to end wall 10, has a threaded lubrication fitting 32, threaded as at 33, similar to 28, and supports the outer race of the sealed bearing 22 and is rotatably supported by trunnion housing 26.

A triple-seal and spacing means 34 fills the space between end wall 10, shaft 12, sealed bearing unit 22, and housing 30. The first, relatively rigid and tough seal 36 is disposed adjacent end wall 10, surrounds shaft 12, and is partially bent or curved (during final assembly) at 38, to very snugly engage shaft 12 and to enter an aperture 40 in end wall 10 through which shaft 12 passes. This first seal 36 is preferably made of urethane, offering high level abrasion and wear resistance, and also being impervious to any extreme weather conditions that may be encountered in use. A first annular metal spacer 42 has the same outside diameter as 36 but a larger internal diameter, leaving space for lubricant between 42 and 12. A first of two relatively "soft" (as compared to 36) seals 44—44 of synthetic rubber such as Buna S have sandwiched therebetween a second single metal spacer 46. The inside diameters and outside diameters of 44 and 46 are similar to those of 36 and 42, respectively. A third single spacer 47 is disposed against the seal 44 remote from the end wall 10.

A double metal spacer 50, having the same outside diameter as 42 and 46, but with a much larger internal diameter, and also having additional "pocketed" flange means, as at 52, provides additional space for lubricants entering from 32-33; and, 50 abuts the sealed bearing unit 22. The double spacing means 50-52 provides a main receiving and storage area for lubricants entering from 32 as they pass into the space between the metallic spacers 42, 46, 47, 50-52, and shaft 12; and, when applied under pressure, the lubricants pass under the "bent" lips 54—54 (similar to 38) and on to 36-38, and through aperture 40 the lubricant passes interiorly of the end wall 10.

As indicated above, during the final assembly of the triple seal (36, 44—44), and spacing means (42, 46, 47, 50-52) within the multi-part seal housing 14, the innermost peripheral edges (38 and 54) of 36 and 44 are bent toward end wall 10, as illustrated, in order to provide for the "flushing" of any foreign material from the seal housing 14 back to the other side of end wall 10 when pressurized lubricants are inserted through 32. This provides the most efficient sealing means we are aware of at the lowest possible cost. The urethane seal 36 is relatively rigid and is the most expensive part of the sealing arrangement and it has a close fit with shaft 12. The "softer" Buna S seals 44—44 allow grease to pass, create minimal drag upon the rotation of shaft 12, and yet provide the additional sealing required, and not possible with but a single urethane seal. Correspondingly, such a sealing arrangement is less expensive than plural urethane seals. Because of the highly abrasive nature of sand, lime, cement, and similar materials found in plaster and mortar mixers which have dumpable drum and rotating paddle shaft 12 an effective and long lasting sealing arrangement has eluded manufacturers for years, and this seal remedies the defects found in prior art seals. Thus, better lubrication and sealing of the bearing unit 22 which supports the shaft 12 from housing 30 is accomplished which provides for longer life expectancy of the bearing unit 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A triple seal and bearing assembly for receiving and supporting one end portion of a driven rotary shaft, said assembly including a housing adapted to be secured to an end wall of a receptacle through which the driven shaft passes, a bearing unit surrounding said shaft and supporting the shaft from the housing, adjacent the extremity of the shaft, a trunnion member surrounding and journaling said housing from a support, means lubricating the interior of the trunnion member, said assembly including a plurality of alternating, annular, seals and spacer means partially filling the space between said end wall and said bearing unit, a further lubrication means in communication with the space containing said seals and spacer means, the first seal immediately adjacent said end wall being a urethane seal followed by a single spacer, a first of two synthetic rubber seals, a second single spacer, a second synthetic rubber seal, a third single spacer, and a double spacer filling the space between said second seal and said bearing unit, the inner edges of the annular seals being bent toward said end wall, during assembly, so that any foreign material which may have entered during rotation of said shaft will be forced back toward the end wall when pressurized lubricant is forced into the space receiving the seals and spacer means.

2. The structure as defined in claim 1 wherein said receptacle is a mortar or plaster mixer drum rotatable about the axis of the shaft for dumping, said shaft being the paddle shaft and extending through an aperture in the end wall, said spacer means having an internal diameter larger than the shaft to provide a lubricant reservoir along the shaft, said double spacer having axially offset flange means providing radial passageways for lubricant from said housing to the periphery of the shaft.

3. The structure as defined in claim 2 wherein said shaft includes a lock collar removably mounted on the end thereof remote from the end wall for engaging the bearing unit, said bearing unit being a ball bearing unit having an inner race engaged by the lock collar and an outer race seated against a shoulder in said housing, said housing and trunnion member having cylindrical bearing surfaces enabling rotatable movement of the housing and drum independent of rotation of the paddle shaft.

4. A seal and bearing assembly for sealing and supporting one end portion of a rotary shaft, said assembly including a housing adapted to be secured to an end wall of a receptacle through which the shaft passes, a bearing unit surrounding said shaft and rotatably supporting the shaft from the housing, adjacent the extremity of the shaft, a trunnion member surrounding and journaling said housing from a support to enable pivotal movement of the receptacle, means lubricating the interior of the trunnion member and the exterior of the housing, said assembly including a plurality of annular seals and spacers partially filling the space between said end wall and said bearing unit, lubrication means in communication with the space containing said seals and spacers, the first seal being disposed against said end wall and being a substantially rigid, wear resistant seal, a first single spacer against said first seal, a first relatively soft seal against the first spacer, a second single spacer against the first relatively soft seal, a second relatively soft seal against the second spacer, a third single spacer against the second relatively soft seal, and a double spacer filling the space between said third spacer and said bearing unit, the inner edges of the annular seals being deflected toward said end wall, during assembly, so that any foreign material which may have entered during rotation of said shaft will be forced back toward the end wall when pressurized lubricant is forced into the space receiving the seals and spacers, said receptacle being a mortar or plaster mixer drum pivotal about the axis of the shaft for dumping, said shaft being the paddle shaft and extending through an aperture in the end wall, said spacers having an internal diameter larger than the shaft to provide a lubricant reservoir along the shaft, said double spacer having axially offset flange means providing radial passageways for lubricant from said housing to the periphery of the shaft.

5. The structure as defined in claim 4 wherein said first seal is constructed of urethane, said first and second relatively soft seals being constructed of synthetic rubber, and a lock collar on the end of the shaft engaging the bearing unit to maintain axial assembly of the shaft and bearing unit.

* * * * *